March 31, 1959  N. I. BOHLIN  2,879,715
EJECTION SEAT FOR AIRPLANES
Filed Sept. 25, 1956  3 Sheets-Sheet 1

Inventor
Nils I. Bohlin
By ...
Attorneys

March 31, 1959  N. I. BOHLIN  2,879,715
EJECTION SEAT FOR AIRPLANES
Filed Sept. 25, 1956  3 Sheets-Sheet 2
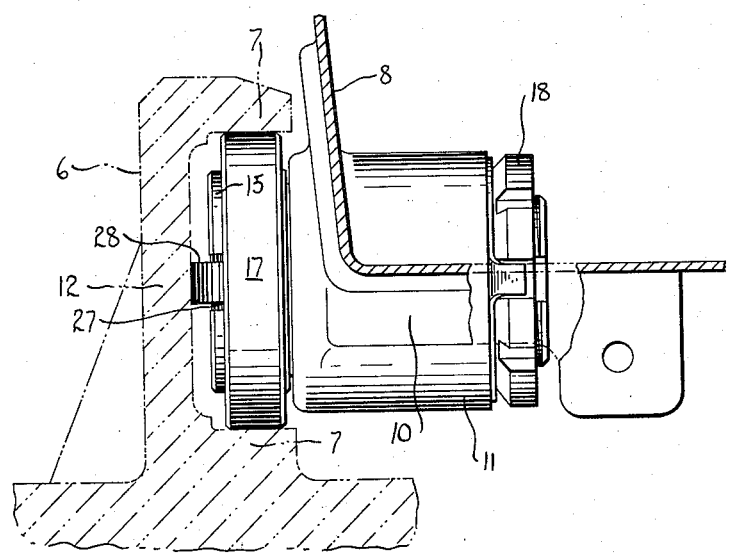
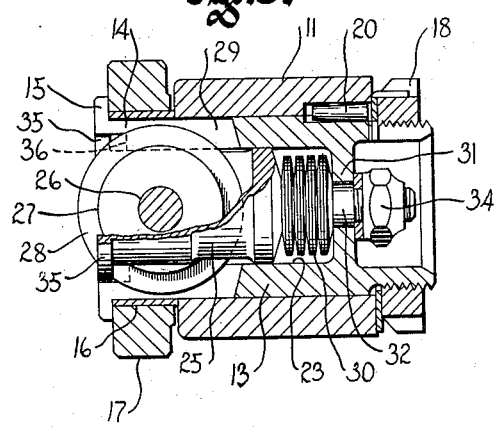
Inventor
Nils I. Bohlin
By
Attorneys

United States Patent Office 2,879,715
Patented Mar. 31, 1959

2,879,715

EJECTION SEAT FOR AIRPLANES

Nils I. Bohlin, Linkoping, Sweden, assignor to Svenska Aeroplan Aktiebolaget, Linkoping, Sweden, a corporation of Sweden Application September 25, 1956, Serial No. 611,975

3 Claims. (Cl. 104—246)

This invention relates to so-called ejection seats for airplanes, and refers more particularly to means for ejectably mounting a seat in an airplane and for affording guidance to the seat for ejecting movement along a defined straight-line path.

As is well known, the speed of modern high performance airplanes creates serious problems when emergency escape from such aircraft becomes necessary in flight; and to overcome these problems mechanical devices are employed which assist the crew to leave the airplane in an emergency. If an air crew member left such an airplane simply by jumping from it, his body would immediately be subjected to the force of the air blast created by forward motion of the airplane, by which he might be violently thrown against the tail surfaces or other parts of the airplane.

It has therefore become conventional to provide so-called ejection seats for crew members of high speed aircraft, and particularly in military airplanes. With such a mechanism, the crew member confronted with the need for leaving an airplane in flight actuates an emergency control, and thereupon mechanism in the airplane propels the airman's seat through a hatch opening, literally throwing the flier clear of the ship. The crew member is of course strapped to his seat, and is provided with a parachute which is also secured to his person. In some instances flotation gear and an emergency oxygen supply accompany the airman out of the distressed airplane.

Obviously a very substantial force is required to propel the crew member, his seat, and the accompanying emergency equipment out of the plane, and ejection of the seat must be positive and certain. In order to insure ejection of the seat along a trajectory which will carry the airman well clear of the airplane structure, the seat and the airplane are provided with cooperating guide means by which the seat is in effect "aimed" in the desired direction—usually up or down relative to the level flight position of the airplane.

In some cases, as for example in the event of a servo mechanism failure or the like which locks the ailerons in a fully deflected position, it may be necessary to abandon an airplane at a time when it is rolling continuously and uncontrollably. Under such conditions the seat is subjected to large lateral acceleration loads, which may amount to 10 g. or more. If there is any possibility of friction between the relatively movable parts of the ejection guide means for the seat, such friction will be greatly increased by these severe lateral forces, hampering ejection of the seat and thus seriously jeopardizing the airman's safety.

Heretofore in ejection seat mechanisms rails fixed in the airplane afforded guidance to the seat in the initial portion of its ejection path and rollers on the seat cooperated with the rails to constrain the seat to movement therealong. However, the arrangement was such that the rollers could assume only those loads which were imposed substantially parallel to the airplane's longitudinal axis, and consequently lateral load forces on the seat were not properly accommodated.

It is therefore a general object of this invention to provide means for mounting an ejection seat in an airplane and for guiding the seat in the initial portion of its ejection path, whereby the seat is guided for movement in a predetermined straight-line path (which path is normally parallel to the plane of symmetry of the airplane) and wherein only negligible friction exists between the relatively fixed and movable members of the seat guiding means under any condition of acceleration which might be imposed upon the seat by maneuvers of the airplane.

More specifically, it is an object of the present invention to provide guidance means for an airplane ejection seat of the character described, whereby ejection guidance is afforded to the seat with substantially negligible hindrance to movement of the seat along its ejection path despite any lateral load forces to which the seat may be subjected in consequence of lateral accelerations, and which guidance means comprises guide rails fixed in the airplane, extending substantially parallel to its vertical axis, and roller means on the seat cooperable with said rails to afford such guidance of the seat along said rails.

Still another object of this invention resides in the provision of roller guides for a roller mounted carriage such as the mounting means for an airplane ejection seat, whereby the carriage is constrained to motion in a pair of opposite directions, and means mounting rollers on the carriage for cooperation with the guides, wherein the rollers are so disposed that contact between the carriage and the guides is at all times afforded solely through rolling engagement of the rollers with the guides, and wherein slight departures from true parallelism of the guides are accommodated by the rollers.

With the above and other objects in view, which will appear as the description proceeds, this invention resides in the novel construction, combination and arrangement of parts substantially as hereinafter described and more particularly defined by the appended claims, it being understood that such changes in the precise embodiment of the hereindisclosed invention may be made as come within the scope of the claims.

The accompanying drawings illustrate two complete examples of the physical embodiments of the invention constructed according to the best modes so far devised for the practical application of the principles thereof, and in which:

Figure 2 is a fragmentary view on an enlarged scale, taken on the plane of the line 2—2 in Figure 1;

Figure 3 is a longitudinal sectional view of the roller mechanism shown in Figure 2, shown with the guide roller bias spring in its uncompressed position;

Referring now to the accompanying drawings, in which like numerals designate like parts throughout the several views, the numeral 5 designates generally an ejection seat of the type which is intended to be launched from and airplane under emergency conditions to carry its occupant (shown in broken lines) safely clear of the airplane.

Figure 1:
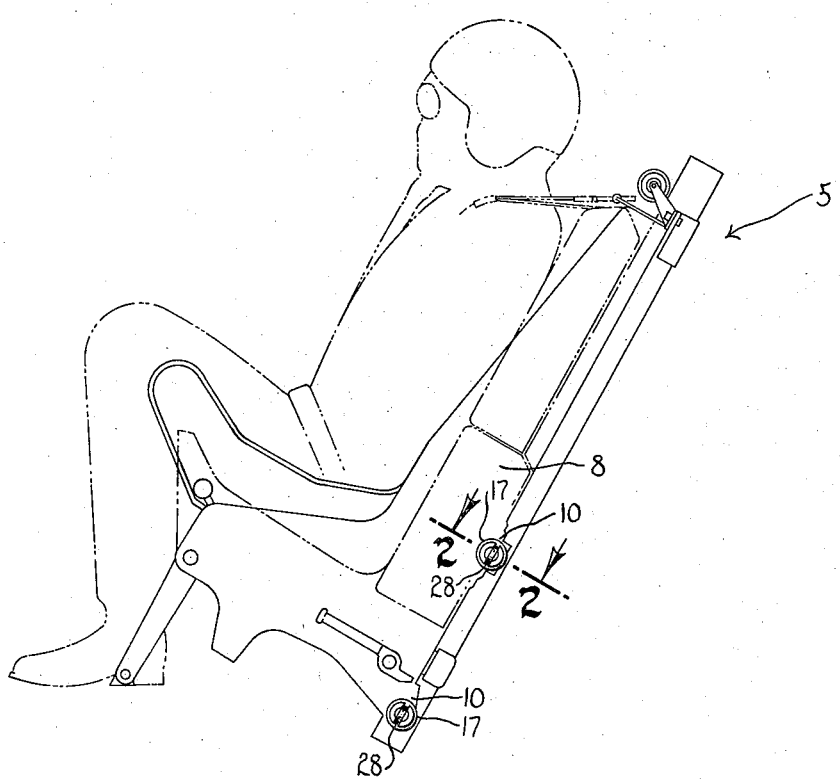
Figure 1 is a more or less diagrammatic side elevational view of an airplane ejection seat embodying the principles of this invention.
Figure 4:
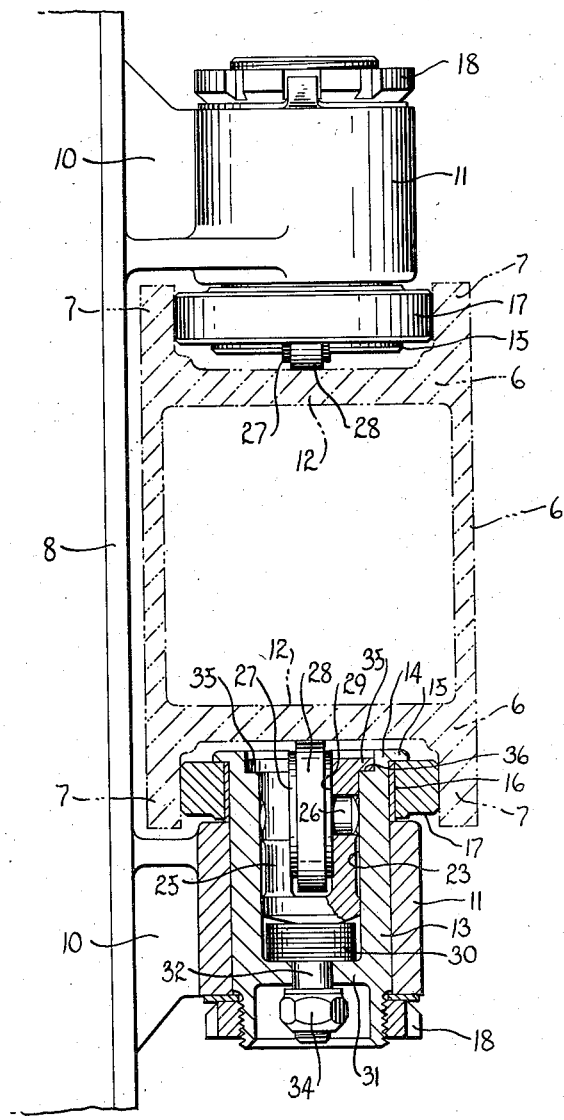
Figure 4 is a top view, partly in section, showing a pair of roller mechanisms like those illustrated in Figures 2 and 3 cooperating, however, with guide rails of a modified type, one of the roller mechanisms being shown in its spring-compressed load assuming position.

Fixed to the structure of the airplane are a pair of channel shaped guide rails 6 by which the seat is carried, both when it is occupying its normal position (shown in Figure 2) and during the initial part of its ejection from the aircraft, when the rails guidingly define the path along which the seat is to be propelled. The guide rails are so disposed in the airplane that they extend parallel to one another and transverse to the longitudinal axis of the airplane, that is, substantially up and down relative to the level flight position of the airplane; and the flanges 7 of the two guide rails project in opposite directions. As indicated in Figure 2, the guide rails may be disposed with their flanges projecting toward one another, or, as shown in Figure 4, the two channel shaped guide rails 6 may comprise portions of a unitary beam-like member 6', having the flanges 7 of the two channel-like portions projecting away from one another.

The seat has suitable frame members 8 upon which are mounted rollers as hereinafter described, so that the seat assembly in effect comprises a carriage cooperable with the rails. On this carriage are a plurality of brackets 10 (four such brackets being a suitable number), each of which includes a substantially tubular or sleeve-like holder portion 11. The brackets are arranged in pairs, with the sleeve-like holders of each pair of brackets disposed on a common axis, and with the holder of one bracket of each pair adjacent to the web portion 12 of one channel and the other adjacent to the web of the other channel.

A stub shaft 13 is carried in the holder of each bracket, with the end portion 14 of the stub shaft nearest the channel projecting from the holder and disposed between the flanges of the channel. At its end adjacent to the channel each stub shaft has a circumferential flange 15, and between this flange and the adjacent end of the holder of the bracket may be interposed a thin annular bushing 16 of suitable bearing material, upon which an annular tracking roller 17 is journaled, being confined against axial displacement by the flange 15 and the adjacent end of the holder. The stub shaft is secured in the holder by means of a nut 18 threaded onto the end of the stub shaft remote from the flange 15 and cooperating with the adjacent end of the holder to prevent displacement of the stub shaft toward the channel web, its displacement in the opposite direction being of course prevented by the flange 15. The stub shaft is further secured against displacement out of its holder by means of a wedge 20 engaged in suitable grooves in the stub shaft and the tubular portion of the bracket.

It will be observed that each tracking roller 17 is disposed between the flanges of a channel for rolling engagement with the flanges, and that the several tracking rollers thus cooperate with one another and with the channel flanges to confine the carriage against movement transversely to the flanges. The seat is also confined against movement transversely to the webs of the channels, without interfering with ejecting movement of the seat, by means now about to be described.

Each of the stub shafts has a coaxial bore 23 opening toward its adjacent channel web, and slidably carried in this bore is a bifurcated plunger-like support 25. A transverse shaft 26 is carried by the bifurcations of the support, and this shaft in turn mounts a hub 27 between the bifurcations, upon which a guide roller 28 is journaled. The bifurcated support is prevented from rotating in the bore in the stub shaft by reason of the engagement of opposite peripheral portions of the guide roller hub 27 in diametrically opposite longitudinal slots 29 in the stub shaft, opening to its end adjacent the channel web and disposed parallel to the lengths of the channel flanges; and in this manner the axis of each guide roller is at all times maintained perpendicular to the flanges of the channels and, of course, parallel to the webs thereof. The guide roller 28 is somewhat narrower than its hub, so that its side edges will not drag on the inner surfaces of the slots and interfere with its free rotation.

Slight departures from parallelism between the channel webs are accommodated by the axially slidable mountings of the bifurcated supports, by which the guide rollers may be translated toward and from the channel webs, and each of the guide rollers is at all times urged toward its adjacent channel web by means of a compression spring 30 confined between the inner face of an end wall 31 in the stub shaft and the inner end of the plunger-like bifurcated support. A coaxial stem 32 projects from the bifurcated support through a reduced diameter bore in said end wall 31, and a nut 34 threaded onto the free end of this stem provides a stop which limits axial travel of the support toward the channel web. The stem, of course, also serves to pilot the compression spring and hold it centered in the bore in the stub shaft.

Displacement of the guide roller away from its adjacent channel web is limited by inwardly facing shoulders defined by a flange 35 on the outer end of each of the support bifurcations, which flanges can engage the bottom of a shallow counterbore 36 at the mouth of the bore in the stub shaft.

It will be understood that the diameter of each of the tracking rollers 17 is slightly less than the distance between the inner faces of the channel flanges 7 with which the tracking roller is adapted to engage, so that each tracking roller will be engaged with only one flange 7 at any given instant, depending upon the direction of load forces upon the seat, but such rolling engagement between the tracking rollers and the flanges will nevertheless afford definite but substantially frictionless guidance to the seat during ejection thereof.

From the foregoing description taken together with the accompanying drawings it will be apparent that this invention provides means for mounting an ejectable seat in an airplane, and for guiding the seat during the initial portion of its ejecting movement, whereby the seat is definitely constrained to motion along a predetermined path of ejection, but wherein the cooperating guide means have negligible friction, so that ejection of the seat is not hindered thereby regardless of the direction or magnitude of lateral forces on the seat due to acceleration or loading.

What is claimed as my invention is:

1. In a device of the type having a movable carriage cooperable with a pair of fixed channel shaped guide rails disposed parallel to one other, with the flanges of the channels projecting in opposite directions: a plurality of stub shafts fixed on the carriage with their axes parallel to one another, said stub shafts being disposed on the carriage in opposite pairs, and each projecting between the flanges of a channel, with the axis of each stub shaft perpendicular to the web of its adjacent channel, each of said stub shafts having a bore opening toward the web of its adjacent channel; a tracking roller journaled on each of said stub shafts and guidingly engaged with the flanges of its adjacent channel; a bifurcated support axially slidable in the bore of each stub shaft with its bifurcations projecting toward the mouth of the bore; a guide roller freely rotatably supported between the bifurcations of each of said supports; cooperating means on each of said supports and on the stub shaft in which it is slidable for precluding rotation of the support out of a position in which the guide roller carried thereby has its axis transverse to that of the tracking roller and to the flanges of the channel and substantially parallel to the web of the channel; and means yieldingly biasing each of said bifurcated supports into engagement with the web of its adjacent channel to at all times maintain the guide roller in rolling engagement with said web, so that the guide rollers cooperate with the tracking rollers to constrain the carriage to motion along a path parallel to the rails and to minimize friction between the carriage and the rails.

2. Means for confining a carriage to straight line motion along a pair of fixed channel shaped guiding tracks extending parallel to one another, with the flanges of the channels projecting in opposite directions: a plurality of pairs of coaxial stub shafts fixed on the carriage, the stub shafts of each pair projecting in opposite directions and each being disposed between the flanges of a channel, the axes of all of said stub shafts being disposed in a common plane perpendicular to the webs of the channels, and each of said stub shafts having a bore opening toward the web of the channel; a bifurcated carrier axially slidably mounted in the bore in each stub shaft with its bifurcations projecting toward the mouth of the bore; a guide roller freely rotatably mounted between the bifurcations of each carrier, said guide roller having a diameter substantially greater than that of the bore in the stub shaft and having peripheral portions received in slots in the stub shaft opening into the bore and by which the guide roller is confined to rotation on an axis parallel to the web of the channel and transverse to its flanges; means yieldingly biasing each carrier toward the mouth of the bore in its stub shaft so as to at all times maintain the guide roller in rolling engagement with its adjacent channel web; and an annular roller journaled on each stub shaft and substantially encircling the guide roller, each of said annular rollers being engageable with the flanges of its adjacent channel to cooperate therewith in guiding the carriage for movement parallel to the tracks.

3. In a device of the type comprising a carriage and a substantially channel-shaped track adapted to guide the carriage for movement lengthwise of the track, means on the carriage cooperable with the track for effecting such guidance of the carriage without substantial hinderance to its movement along the track, said means comprising: a bracket on the carriage including a substantially sleeve-like holder, the axis of which is substantially perpendicular to the web of the channel shaped track; a stub shaft in said holder having an end portion projecting beyond the holder and disposed between the flanges of the channel shaped track, said stub shaft having an axial bore opening to said end thereof and an end wall defining a shoulder in the bore facing the mouth thereof, said stub shaft also having a pair of diametrically opposite slots opening to its bore near the mouth thereof and disposed parallel to the length of the flanges of the channel shaped track; a tracking roller freely rotatably journaled on the projecting end portion of the stub shaft and rollingly engageable with the flanges of the track; a bifurcated support axially slidable in the bore in the stub shaft; a shaft supported by the bifurcations of the support, with its axis transverse to that of the tracking roller; a guide roller freely rotatably journaled on said shaft and having opposite peripheral portions in said slots in the stub shaft, to be thereby constrained to rotation on an axis substantially perpendicular to the flanges of the channel shaped track; and a compression spring confined between said end wall in the stub shaft and the inner portion of the bifurcated support and yieldingly urging the support axially outwardly in the bore to thus at all times maintain the guide roller in rolling engagement with the web of the channel shaped track.

References Cited in the file of this patent

UNITED STATES PATENTS

| | | |
|---|---|---|
| 1,793,288 | Martin | Feb. 17, 1931 |
| 1,825,468 | Miller | Sept. 29, 1931 |
| 2,503,120 | Meyer | Apr. 4, 1950 |
| 2,522,654 | Wamsley | Sept. 19, 1950 |
| 2,709,556 | Jandris | May 31, 1955 |
| 2,755,042 | Paddon | July 17, 1956 |